United States Patent
Uchida et al.

(10) Patent No.: US 8,204,877 B2
(45) Date of Patent: Jun. 19, 2012

(54) POINT OF INTEREST SEARCH DEVICE AND POINT OF INTEREST SEARCH METHOD

(75) Inventors: Takayuki Uchida, Tokyo (JP); Yukihiro Kawamata, Tokyo (JP); Yukio Miyazaki, Tokyo (JP); Osamu Tomobe, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 396 days.

(21) Appl. No.: 12/431,459

(22) Filed: Apr. 28, 2009

(65) Prior Publication Data

US 2009/0271400 A1     Oct. 29, 2009

(30) Foreign Application Priority Data

Apr. 28, 2008    (JP) ................. 2008-117426

(51) Int. Cl.
*G06F 7/00* (2006.01)
(52) U.S. Cl. ................. 707/718; 707/765
(58) Field of Classification Search ............ None
See application file for complete search history.

(56) References Cited

U.S. PATENT DOCUMENTS

| | | | |
|---|---|---|---|
| 6,272,507 B1 * | 8/2001 | Pirolli et al. ............... 715/206 |
| 6,366,904 B1 * | 4/2002 | BenHadda et al. ........ 707/700 |
| 7,505,973 B2 * | 3/2009 | Kapadia et al. ............ 1/1 |
| 7,610,262 B2 * | 10/2009 | Yoshida et al. ............ 1/1 |
| 7,620,624 B2 * | 11/2009 | Stata et al. ................ 1/1 |
| 2003/0131025 A1 * | 7/2003 | Zondervan et al. ........ 707/200 |
| 2003/0158831 A1 * | 8/2003 | Zaremba ................... 707/1 |
| 2004/0205046 A1 * | 10/2004 | Cohen et al. .............. 707/3 |
| 2005/0021510 A1 | 1/2005 | Uchida et al. |
| 2006/0206547 A1 * | 9/2006 | Kulkarni et al. .......... 707/205 |
| 2008/0172377 A1 * | 7/2008 | Kapadia et al. ........... 707/5 |

FOREIGN PATENT DOCUMENTS

| | | |
|---|---|---|
| JP | 11-242432 A | 9/1999 |
| JP | 2005-43966 A | 2/2005 |

* cited by examiner

*Primary Examiner* — Robert Timblin
*Assistant Examiner* — Richard Bowen
(74) *Attorney, Agent, or Firm* — Crowell & Moring LLP

(57) ABSTRACT

A point of interest (POI) search device includes: a static POI data storage means for storing therein a static POI data registered in advance; an added POI data storage means for storing therein an added POI data added or changed; a deleted POI data storage means for storing therein a deleted POI data for identifying a POI data which is not subjected to a search anymore, among the static POI data; a search keyword setting means; a computation switch means for computing the number of POI data matching the search keyword from among the static POI data and switching a computation processing of computing the number of POI data according to the computed number of POI data; and a POI search means for computing the number of POI data, using at least the static POI data and the added POI data according to the switched computation processing.

11 Claims, 12 Drawing Sheets

FIG.3A

Static POI Data Table T1

| POI ID | POI Name | Operating Hours | POI Category |
|---|---|---|---|
| f1 | POI F1 | 8-20 | Department store |
| f2 | POI F2 | 8-21 | Department store |
| f3 | POI F3 | 9-20 | Bookstore |
| f4 | POI F4 | 10-23 | Japanese pinball parlor |
| ⋮ | ⋮ | ⋮ | ⋮ |

Added POI Data Table T2

| POI ID | POI Name | Operating Hours | POI Category |
|---|---|---|---|
| f51 | POI F51 | 6-23 | Convenience store |
| f52 | POI F52 | 10-19 | Hospital |
| f53 | POI F53 | 10-19 | Police box |
| f54 | POI F54 | 10-19 | Restaurant |
| ⋮ | ⋮ | ⋮ | ⋮ |

Deleted POI Data Table T3

| POI ID |
|---|
| f1 |
| f3 |
| f9 |
| f12 |
| ⋮ |

Static POI Data Table 400

| Search Keyword (Area) 410 | Search Keyword (POI Category) 411 | Number of Hits 412 |
|---|---|---|
| Hokkaido | Total | 870350 |
| | Department store | 23 |
| | Hospital | 758 |
| | Bookstore | 1256 |
| | ... | ... |
| | Convenience store | 6705 |
| Aomori | Total | 130350 |
| | Department store | 7 |
| | Hospital | 234 |
| | Bookstore | 987 |
| | ... | ... |
| | Convenience store | 3445 |
| Iwate | Total | 120344 |
| ... | ... | ... |
| Okinawa | Convenience store | 89 |

FIG.4B

Static POI Count Table 400'

| | Search Keyword (POI Name Character) 413 | Number of Hits 414 |
|---|---|---|
| First Character | a | 984890 |
| | b | 673242 |
| | c | 102345 |
| | ... | ... |
| | z | 0 |
| + Second Character | aa | 9848 |
| | ab | 123456 |
| | ... | ... |
| | az | 6789 |
| | ba | 2345 |
| | ... | ... |
| | zz | 0 |
| + Third and Subsequent Characters | aaa | 125 |
| | aab | 156 |
| | ... | ... |

FIG.7A

Update POI Data of POI to be Changed — T7

| Update Type | POI ID | POI Name | Operating Hours | POI Category |
|---|---|---|---|---|
| Change | f9 | - | 9-17 | - |

FIG.7B

Update POI Data of POI to be Changed — T7'

| Update Type | POI ID | POI Name | Operating Hours | POI Category |
|---|---|---|---|---|
| Change | f9 | POI F9 | 9-17 | Bank |

FIG.8

Data Structure in Temporary Storage Unit — T6

| Type of data | Contents of data |
|---|---|
| Search Result of Static POI Data Table (POI ID) | f1, f2, f3, f4 |
| Number of Hits in Search of Static POI Data Table | 4 |
| Number of Hits in Search of Added POI Data Table | 1 |
| Number of Hits in Search of Deleted POI Data Table | 2 |

- 275 — Search Result of Static POI Data Table (POI ID)
- 276 — Number of Hits in Search of Static POI Data Table
- 277 — Number of Hits in Search of Added POI Data Table
- 278 — Number of Hits in Search of Deleted POI Data Table

Contents of Nonvolatile Memory

| Type of data | Contents of data |
|---|---|
| Total Number of POI data in Static POI Data Storage Unit | 10470230 |
| Threshold in Determining Count Mode | 1000 |

- 290 — Total Number of POI data in Static POI Data Storage Unit
- 295 — Threshold in Determining Count Mode

FIG.13

Search Result of Static POI Data Table

| POI ID | POI Name | Operating Hours | POI Category |
|---|---|---|---|
| f1 | POI F1 | 8-20 | Department store |
| f2 | POI F2 | 8-21 | Department store |
| f3 | POI F3 | 9-20 | Bookstore |
| f4 | POI F4 | 10-23 | Japanese pinball parlor |

FIG.14A

600 Screen

Select Category ▷

- Number of Hits
- Department store
- Bookstore
- Convenience store
- Hospital
- Restaurant
- ⋮

FIG.14B

600' Screen

Select Convenience Store ▷

- Number of Hits | 120000 — 601
- Convenience store 1
- Convenience store 2
- Convenience store 3
- Convenience store 4
- Convenience store 5
- ⋮

POINT OF INTEREST SEARCH DEVICE AND POINT OF INTEREST SEARCH METHOD

CROSS REFERENCE TO RELATED APPLICATIONS

This application claims the benefit of Japanese Patent Application No. 2008-117426 filed on Apr. 28, 2008, the disclosure of which is incorporated herein by reference.

BACKGROUND OF THE INVENTION

1. Field of the Invention

The present invention relates to a technology of searching a point of interest (POI) set as a destination or the like in a navigation apparatus.

2. Description of the Related Art

A POI search function of searching a POI suited to preference or purpose of a user is of importance in a POI search for a navigation apparatus for automobile use, a communication terminal, and the like. Since a set of POI data subjected to a POI search is ever-changing as a matter of course, update of an obsolete POI data is required. If the update is made by rewriting only a changed portion of the POI data, a size of the POI data can be reduced, thus allowing distribution cost of the POI data also to be reduced.

Actually, however, a set of POI data includes not only a data of each POI but also a management data for managing the set of POI data as a whole and performing a search or an update thereof. The management data includes storage address values of respective POI data, of which data amount is enormous. Thus, even if a portion of a single POI data is rewritten, all the addresses that follow the rewritten POI data are displaced subsequently, and thus, a large volume of the displaced storage address values in the management data has to be rewritten.

For the reason described above, there is a problem that an update processing of POI data including the management data takes a large load. Japanese Published Patent Application No. 2005-043966 discloses a technique for solving the problem, in which a POI data which is stored at the time of manufacturing a device having a POI search function is managed separately from a POI data which is updated after the manufacturing. Further, the updated POI data is managed separately divided into a deleted POI data, an added POI data, and a changed POI data. A search result after the update is obtained by combining the POI data at the manufacturing with the deleted, added and changed POI data.

In some cases, however, a POI search according to the related art has a difficulty in quickly computing the number of found POIs, that is, the number of hits. More specifically, if a POI data stored at the time of manufacturing is managed separately from a POI data updated after the manufacturing, it is necessary to compute the number of the deleted POI data from among the POI data stored at the manufacturing so as to precisely obtain the most updated number of hits. For this purpose, the deleted POI data needs to be identified, and each of the identified deleted POI data needs to be determined whether or not it is actually deleted from a search result. Thus, if the number of hits as the search result is large, the number of times for checking the deleted POI data is also large, which increases a time required for computing the number of hits.

It is to be noted that the number of hits is an important measure in estimating a car navigation apparatus which requires saving of a trouble of inputs by a user as much as possible. In conducting a POI search, a user successively inputs search keywords so as to narrow search results. Desirably, the number of hits is not zero but not too large to be difficult in looking at all of the hit POI data one by one by the user. Thus, the number of hits is a good measure for estimating whether or not a user has obtained an appropriate number of search results. A quick presentation of the number of hits is indispensable for convenience of a user each time the user inputs a search keyword.

The present invention has been made in an attempt to meet such needs of users and provides a device and method for quickly obtaining the number of hits as a search result while reducing a load of processing.

In the present invention, the number of hits as a search result is calculated as follows. First, it is determined whether or not computation of the number of deleted POI data, which has already been deleted and is not a target of the search anymore, is to be reflected in computing the number of hits of the searched POI data. Only if the computation of the deleted number is determined to be reflected, the number of hits is computed by doing so. If not, without doing so.

SUMMARY OF THE INVENTION

A POI search device includes: a static POI data storage means for storing therein a static POI data which is a POI data registered in advance; an added POI data storage means for storing therein an added POI data which is a POI data added or changed; a deleted POI data storage means for storing therein a deleted POI data for identifying a POI data which is not subjected to a search anymore, among the static POI data; a search keyword setting means for setting a search keyword; a computation switch means for computing the number of POI data matching the search keyword from among the static POI data and switching a computation processing of computing the number of POI data as a search result to be presented to a user according to the computed number of POI data; and a POI search means for computing the number of POI data as the search result to be presented to the user, using at least the static POI data and the added POI data according to the computation processing switched by the computation switch means.

Other features and advantages of the present invention will become more apparent from the following detailed description of the invention, when taken in conjunction with the accompanying exemplary drawings.

BRIEF DESCRIPTION OF THE DRAWINGS

FIG. 3A, FIG. 3B, and FIG. 3C are a static POI data table, an added POI data table, and a deleted POI data table, respectively.

FIG. 4A and FIG. 4B are each a static POI count table.

FIG. 7A and FIG. 7B are configuration diagrams each showing an update POI data of a POI data to be changed.

FIG. 8 is a configuration diagram showing a data structure of a temporary storage unit.

FIG. 13 is a diagram showing an example of a search result.

FIG. 14A and FIG. 14B are diagrams each showing an example of a display of the number of hits.

DETAILED DESCRIPTION OF THE EXEMPLARY EMBODIMENT

With reference to attached drawings, a navigation apparatus to which a POI search device according to an embodiment of the present invention is applied is described below.

Figure 1:
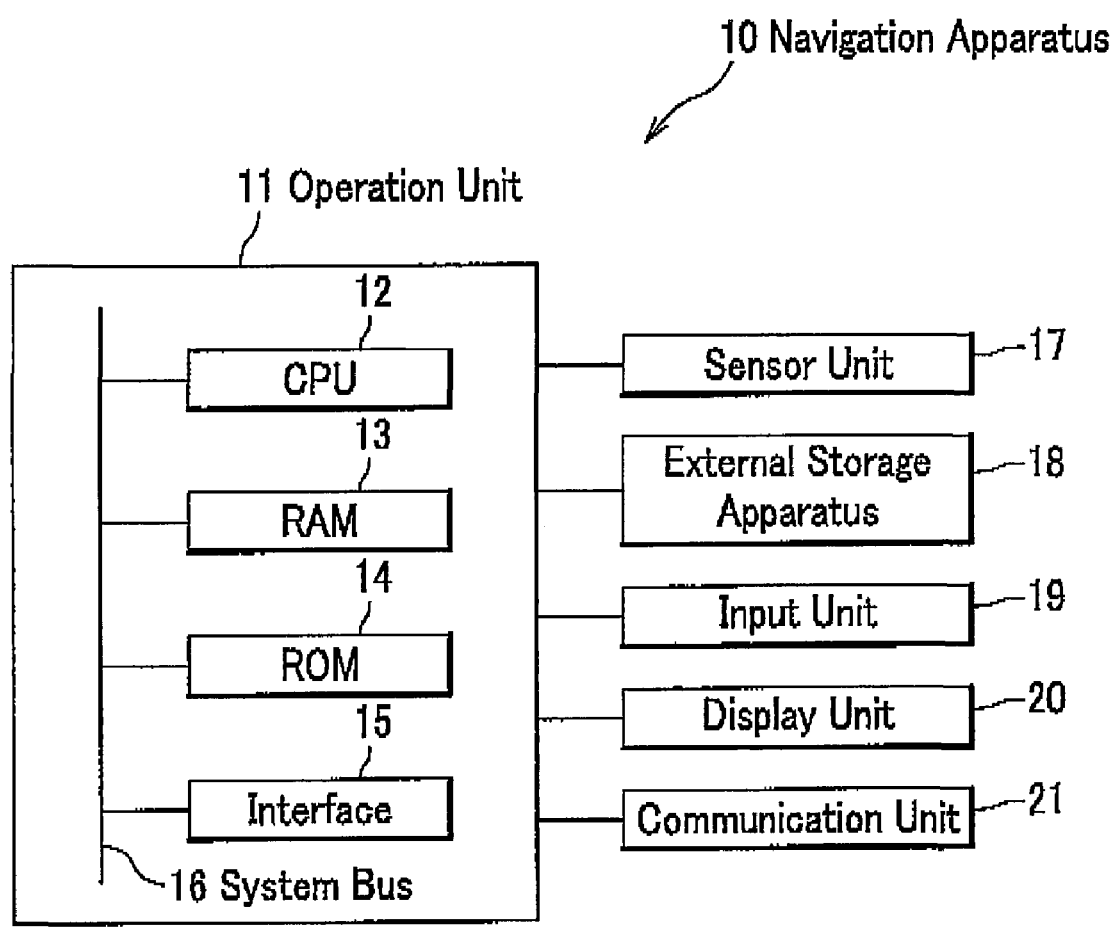
FIG. 1 is a schematic block diagram showing a navigation apparatus according to an embodiment of the present invention.

FIG. 1 is a schematic block diagram showing a navigation apparatus 10.

The navigation apparatus 10 includes an operation unit 11, a sensor unit 17, an external storage apparatus 18, an input unit 19, a display unit 20, and a communication unit 21.

The operation unit 11 is configured by a computer including: a CPU (Central Processing Unit) 12 as a main control unit; a RAM (Random Access Memory) 13 as a main memory for temporarily storing therein a data or the like; a ROM (Read Only Memory) 14 for recording therein a program or the like; an interface 15 for controlling input and output from and to a host or the like; and a system bus 16 for serving as a communication path between the above-mentioned components.

The sensor unit 17 is embodied by a vehicle speed sensor or a gyroscope. The sensor unit 17 may include a GPS (Global Positioning System) receiver.

The external storage apparatus 18 is configured by a data rewritable storage device such as a hard disk and a flash memory and stores therein various types of data used in the navigation s apparatus 10.

The input unit 19 is a user interface for receiving instructions from a user. The input unit 19 is configured by a hard switch, a touch panel, a dial switch, or the like and transmits an input value or a command inputted by a user to the operation unit 11.

The display unit 20 displays a search keyword set by a user via the input unit 19 or the number of hits as a search result, to the user. The display unit 20 may be a visual display such as a liquid crystal display and a CRT. The display unit 20 may include a speaker for an audio output. For a visual display of a data, the operation unit 11 has a video card for converting a character data into a screen-displayable format. For audio display of the data, the operation unit 11 stores a speech synthesis software for converting a character data into a speech in a storage device thereof.

The communication unit 21 communicates a data between the navigation apparatus 10 and an external data distribution device. A communication system of the communication unit 21 is not specifically limited and may be wired or wireless.

Figure 2:
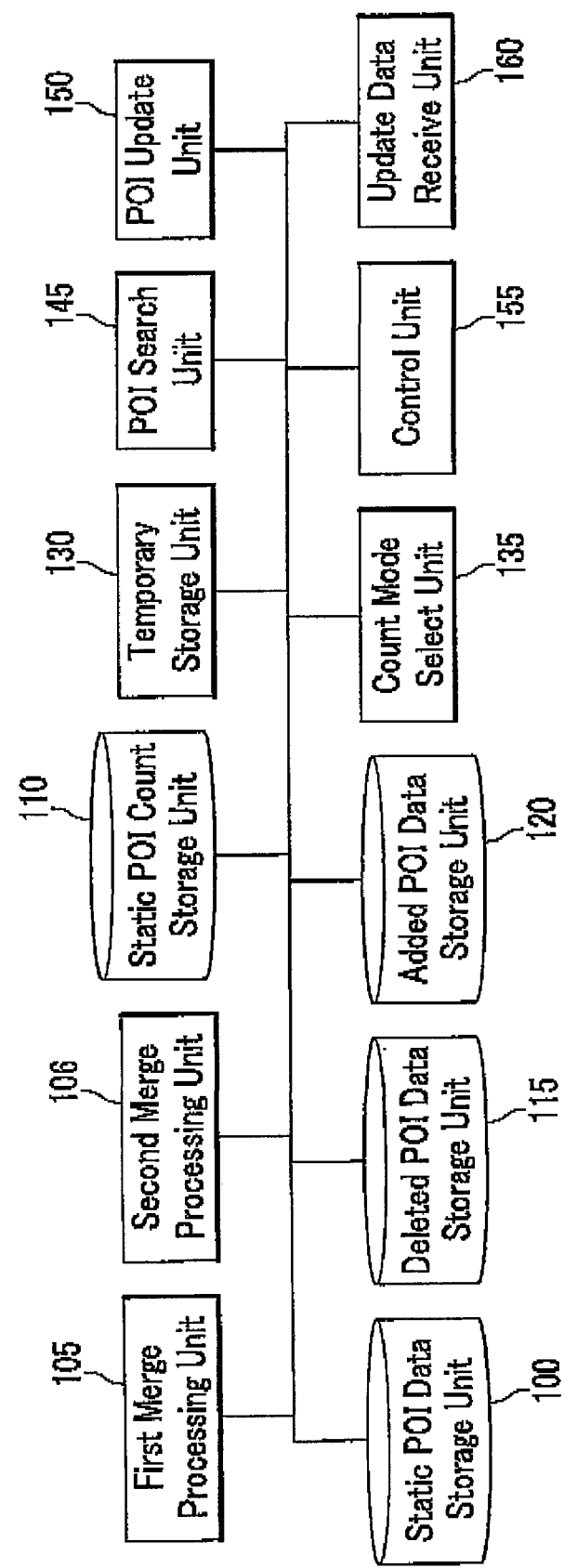
FIG. 2 is a functional block diagram showing the navigation apparatus according to the embodiment.

FIG. 2 is a functional block diagram showing the navigation apparatus 10. FIG. 3 to FIG. 7 are diagrams each showing a configuration of data subjected to a processing by the navigation apparatus 10.

It is to be noted that the navigation apparatus 10 has a functional unit for performing basic functions such as an actual location computing processing, a route search processing, and a route guidance processing. However, descriptions of the basic functions of the functional units are omitted herefrom and only a description of a characteristic function thereof in the present invention is provided below.

The navigation apparatus 10 includes, as the function unit, a static POI data storage unit 100, a static POI count storage unit 110, an added POI data storage unit 120, a deleted POI data storage unit 115, an update data receive unit 160, a POI update unit 150, a first merge processing unit 105, a count mode select unit 135, a POI search unit 145, a second merge processing unit 106, and a control unit 155.

Functions of the above-mentioned components of the navigation apparatus 10 are fulfilled by executing a prescribed program which is loaded by the CPU 12 into the main memory 13. The above-mentioned storage units 100, 110, 115, 120 are each configured on a RAM or the external storage apparatus 18.

The static POI data storage unit 100 stores therein a static POI data which is a data on a POI stored at the time of manufacturing the navigation apparatus 10, that is, before shipment. Typically, the static POI data is not subjected to a rewrite so frequently as an added POI data to be described later. However, where necessary, a set of static POI data belonging to an area or the like is subjected to a mass rewrite.

The static POI data includes: an ID data for identifying a POI; a POI name by which a user conducts a search; operating hours of the POI; and a POI category indicating a type of the POI. As shown in FIG. 3A, the static POI data is stored in the static POI data storage unit 100 in a static POI data table T1.

The static POI data table T1 has a record for each POI. The record includes: a POI ID 225 which is a code for identifying a POI; a POI name 230; operating hours 235; and a POI category 240.

In the static POI data table T1, for example, if the POI category 240 is specified, the POI ID 225, operating hours 235, or POI name 230 corresponding to the POI category 240 can be identified. Or, if the POI name 230 is specified, the POI ID 225 or POI category 240 corresponding to the POI name 230 can be identified. That is, if the POI namer POI ID, or POI category is set as a search keyword, a POI data (a record of the data) can be searched.

The static POI count storage unit 110 stores therein the number of hits, which is the number of POI data to be searched if a static POI data is searched by a prescribed search keyword. Similar to the static POI data, a data of the number of hits is stored at the time of manufacturing the navigation apparatus 10, that is, before shipment. Similarly to the static POI data, the data of the number of hits is not subjected to a rewrite so frequently. However, if the static POI data is mass rewritten, the data of the number of hits is also mass rewritten where necessary. As shown in FIG. 4A and FIG. 4B, the data of the number of hits is stored in the static POI count storage unit 110 in static POI count tables 400, 400', respectively.

FIG. 4A is the static POI count table 400 obtained by using search keywords of an area and a POI category. The static POI count table 400 includes the number of hits 412 corresponding to a search keyword (area) 410 and another search keyword (POI category) 411.

In the static POI count table 400 of FIG. 4A, for example, if "Hokkaido" alone is specified as the search keyword (area) 410, 870350 is given as the number of hits 412. If "Department store" is specified as the search keyword (POI category) 411, 23 is given as the number of hits 412.

FIG. 4B is another static POI count table 400' obtained by using a search keyword of initial characters of a POI name in an incremental way. The static POI count table includes the number of hits 414 corresponding to a search keyword (POI name character) 413.

In the static POI data search table 400' of FIG. 4B, if the first character of "a" is specified as the search keyword (POI name character) 413, 984890 is given as the number of hits 414. If the second character of "a" is added to the first character, that is, "aa", 9848 is given as the number of hits 414, which is the number of POIs each having a POI name beginning with "aa".

The added POI data storage unit 120 stores therein a POI data which is added or changed after manufacturing the navigation apparatus 10 (that is, after shipment) in an added POI data table T2. A data structure of the added POI data table T2 of FIG. 3B is the same as a data structure of the static POI data table T1 of FIG. 3A.

The deleted POI data storage unit 115 stores therein a POI ID of a POI data which is deleted after manufacturing the navigation apparatus 10 (that is, after shipment) in a deleted POI data table T3. The deleted POI data table T3 includes only a POI ID 220 of a deleted POI data as shown in FIG. 3C.

As described above, the static POI data table T1 is not rewritten so frequently. Even if a POI data in the static POI data table T1 is specified to be deleted, a record itself of the POI data is not deleted. Instead, a POI ID of the POI data is stored in the deleted POI data table T3. This means that the POI data whose POI ID is stored in the deleted POI data table T5 is excluded from a target for a search.

Substantive configurations of the static POI data storage unit 100, deleted POI data storage unit 115, added POI data storage unit 120, and static POI count storage unit 110 may be each a single file or a plurality of files divided by, for example, areas to which POIs belong. However, in order to carry out a mass update by area to be described later, if the static POI data storage unit 100 is divided into a plurality of files by a certain criterion, the static POI count storage unit 110 is also required to be divided into a plurality of files by the same criterion.

It is assumed herein that a management data of POI data described with reference to JP 2005-43966 A is also included in the respective storage units 100, 110, 115, 120.

The update data receive unit 160 receives a data for updating a POI data (which may also be referred to as an update POI data) via the communication unit 21 or a portable external medium such as a CD-ROM and a DVD-ROM. The update data receive unit 160 decodes the received data in a format in which the POI update unit 150 can process the data.

In this embodiment, an "update" of a POI data is divided into three types, which are namely, "add" indicating that a new POI data is added, "change" indicating that a POI data is partly changed, and "delete" indicating that an "old" data before changed is deleted. An update POI data received by the update data receive unit 160 includes at least one of the types of the update of a POI data to be updated and a POI ID thereof.

FIG. 5 to FIG. 7B each show an example of an update POI data.

The update POI data includes an "update POI data of a POI to be deleted" T4, an "update POI data of a POI to be added" T5, and an update POI data of a POI to be changed" T7.

Each record of the "update POI data of a POI to be deleted" T4 includes an update type 265 of "delete" and a POI ID 270 of an ID of the POI to be deleted.

Each record of the "update POI data of a POI to be added" T5 includes the update type 234 of "add" as well as data similar to those of the static POI data table T1, namely, a POI ID 245, a POI name 250, operating hours 255, and a POI category 260.

Each record of the "update POI data of a POI to be changed" T7 includes an update type 345 of "change" as well as a POI ID 350 of a POI to be changed and an item to be changed of the POI data.

The "update POI data of a POI to be changed" T7 illustrates an example in which only an item of the operating hours 360 in a POI data is changed. More specifically, the update POI data T7 includes the update type 345 of "change" as described above. The update POI data T7 further includes, among the data of the static POI data table T1, the POI ID 350 for identifying a POI data to be changed and the operating hours 360 which is the item to be changed. The update POI data T7 also includes a character data "-" in respective items of a POI name 355 and a POI category 365. An item with the character data "-" in the POI data indicates that the item is not subjected to be changed.

Alternatively, the items of the POI name 355 and the POI category 365, which are not subjected to be changed, may include existing data as shown in an "update POI data of an POI to be changed" T7' of FIG. 7'.

It is to be noted that, even if any item of a POI data is changed, a POI ID of the POI is not changed.

Figure 6:
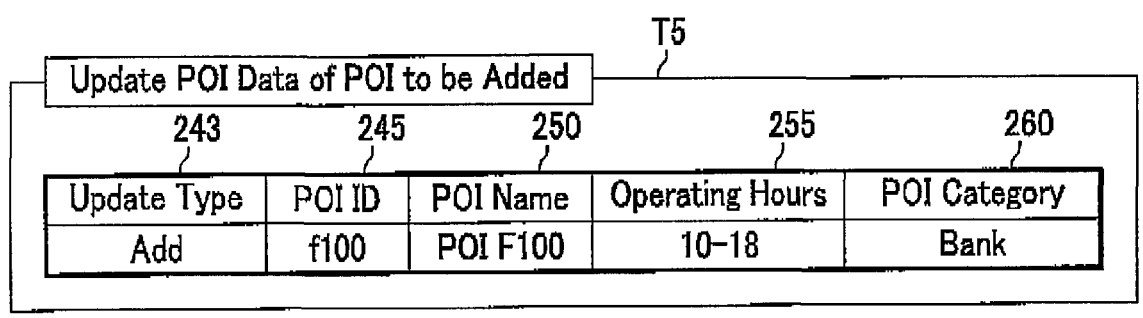
FIG. 6 is a configuration diagram showing an update POI data of a POI to be added.

The POI update unit 150 updates the added POI data table T2 and the deleted POI data table T3. More specifically, upon receiving the "update POI data of a POI to be added" T5 as shown in FIG. 6, the POI update unit 150 adds a record of a POI data to be added, to the added POI data table T2 and stores therein the POI ID 245, POI name 250, operating hours 255, and POI category 260 which are included in the "update POI data of a POI to be added" T5.

Figure 5:
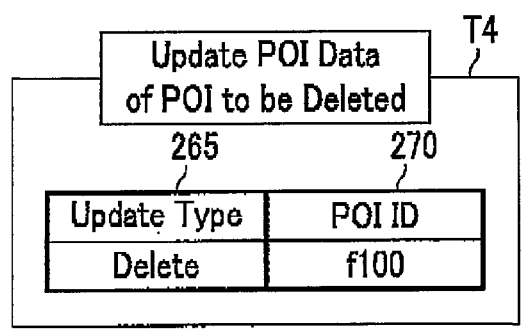
FIG. 5 is a configuration diagram showing an update POI data of a POI to be deleted.

If the POI update unit 150 receives the "update POI data of a POI to be deleted" T4 as shown in FIG. 5, the POI update unit 150 determines whether or not a POI data to be deleted is stored in the added POI data table T2. If the POI update unit 150 determines that the POI data to be deleted is stored in the added POI data table T2, the POI update unit 150 deletes (a record of) the POI data to be deleted. If the POI update unit 150 determines that the POI data to be deleted is not stored in the added POI data table T2, the POI update unit 150 creates a new record of the POI data to be deleted in the deleted POI data table T3 and stores the POI ID 270 thereof included in the "update POI data of a POI to be deleted" T4 in the newly-created record.

The first merge processing unit 105 fills an ineffective item of an update POI data like the "update POI data to be changed" T7 of FIG. 7A, with an appropriate data using an existing POI data. The existing POI data means a POI data having a POI ID identical with that of the update POI data having the ineffective item and found in the static POI data table T1 or the added POI data table T2. The first merge processing unit 105 thus creates a completed update POI data, all of which items include effective data like the "update POI data of a POI changed" T7' of FIG. 7B.

The count mode select unit 135 sets a count mode of the number of hits which is presented to a user. The count mode includes a first number-of-hits count mode and a second number-of-hits count mode. The count mode select unit 135 determines whether or not the number of hits as a result of searching the static POI data table T1 is not more than a prescribed threshold. If the count mode select unit 135 determines that the number of hits is not more than the prescribed threshold, the count mode select unit 135 sets the count mode at the first number-of-hits count mode. If the count mode select unit 135 determines that the number of hits is more than the prescribed threshold, the count mode select unit 135 sets the count mode at the second number-of-hits count mode.

The first number-of-hits count mode is a count mode in which the number of hits presented to a user is obtained by reflecting a data in the deleted POI data table T3. In the first number-of-hits count mode, the number of hits presented to a user is calculated as follows. First, the number of hits of POI data in the deleted POI data table T3 which matches POI data obtained by searching the static POI data table T1 is subtracted from the number of hits obtained by searching the static POI data table T1. And then, the number of hits obtained by searching the added POI data table T2 is added to the subtracted value.

The second number-of-hits count mode is a count mode in which the number of hits presented to a user is obtained without reflecting a data in the deleted POI data table T3. The second number-of-hits count mode allows a quick count of the number of hits presented to a user because a processing of reflecting data in the deleted POI data table T3 is skipped. In the second number-of-hits count mode, the number of hits presented to a user is calculated by only adding the number of hits obtained by searching the added POI data table T2 to the number of hits obtained by searching the static POI data table T1.

A threshold used herein for determining at which mode the count mode is set is determined by designing.

The count mode select unit 135 may set, for example, a total number "n" of POI data (records) registered in the deleted POI data table T3 as a threshold.

If the number of hits as a result of searching the static POI data table T1 is not more than "n", there is a possibility that the number of hits is null if the deleted POI data table T3 is searched. On the other hand, if the number of hits as a result of searching the static POI data table T1 is more than "n", it means that the number of hits presented to a user is one or more. Therefore, the threshold is suitably set at "n", if a precise determination is required whether or not the number of hits is zero when POI data other than those that is not to be searched are searched (that is, only POI data in the static POI data table T1 and the added POI data table T2 are searched without searching POI data in the deleted POI data table T3).

Alternatively, the count mode select unit 135 may set the threshold at a ratio N/n wherein "N" is a total number of POI data in the static POI data table T1 and "n" is a total number of POI data in the deleted POI data table T3.

The ratio N/n is set as the threshold on an assumption that the ratio N/n approximates a ratio of the number of hits in the static POI data table T1 to that in the deleted POI data table T3, in a case where a search keyword used is irrelevant to whether a POI data of interest is "old" or "new".

Based on the above assumption, if the number of hits is "N" when the static POI data table 71 is searched, the number of hits approximates "N'×(n/N)" when the deleted POI data table T5 is searched. If the approximated value is one or more, it is estimated that one or more deleted POIs exist. Therefore, the above-mentioned inequality "N'×(n/N)>1" is rewritten to "N'>N/n", which results in "N/n" as the threshold. If an obtained value exceeds the threshold, the number of deleted POIs is estimated to be one or more. Thus, determination of the count mode is meaningful.

As described above, the count mode select unit 135 may set the threshold at N/n, if it is understood that a search is conducted using a search keyword which is irrelevant to whether a POI data to be searched is "old" or "new".

Whether "N" or "N/n", recomputation of a value of the threshold is required for each update. This is because the total number "n" of POI data in the deleted POI data table T3 changes each time a POI data is updated, though the total number of POI data in the static POI data table T1 remains unchanged from the time the navigation apparatus 10 is manufactured.

The count mode select unit 135 thus recomputes a value of the threshold each time a POI data is updated.

The count mode select unit 135 sets how to determine a threshold according to instructions from a user.

The POI search unit 145 performs a processing of searching a POI data matching a specified search keyword. More specifically, the POI search unit 145 searches the static POI data table T1 in the static POI data storage unit 100, the added POI data table T2 in the added POI data storage unit 120, and the deleted POI data table T3 in the deleted POI data storage unit 115 and obtains respective numbers of hits and POI data as search results. Additionally, the POI search unit 145 searches the static POI count table 400 in the static POI count storage unit 110 and more quickly obtains the number of hits if and when the static POI data table T1 is searched.

If a data to be searched is configured with a plurality of files, the POI search unit 145 searches all of the plurality of files and obtains the numbers of hits and POI data as search results.

The second merge processing unit 106 computes the number of hits to be presented to a user according to a count mode set by the count mode select unit 135, using the above-described expression.

The temporary storage unit 130 temporarily stores therein a data read out from the static POI data storage unit 100, static POI count storage unit 110, deleted POI data storage unit 115, and added POI data storage unit 120.

FIG. 8 shows an example of a data structure T6 of the temporary storage unit 130. The temporary storage unit 130 stores therein a POI ID 275 obtained by searching the static POI data table T1, the number of hits 276 obtained by searching the static POI data table T1, the number of hits 277 obtained by searching the added POI data table T2, the number of hits 278 obtained by searching the deleted POI data table T3, a total number 290 of POI data in the static POI data table T1, and a threshold 295 used in determining a count mode. The above-mentioned data each correspond to a type and contents of the data and are readable where necessary.

The temporary storage unit 130 is configured with a non-volatile semiconductor memory. This is because the total number 290 of POI data in the static POI data table T1 and the threshold 295 used in determining a count mode needs to be maintained even if a power of the navigation apparatus 10 is turned off.

The control unit 155 controls respective units of the navigation apparatus 10. More specifically, the control unit 155 manages data transmission and reception between the respective units and operates the respective units at appropriate timing. For example, the control unit 155 provides controls on transferring a data obtained from a search by the POI search unit 145 to the temporary storage unit 130 or transferring a POI data stored in the temporary storage unit 130 to the display unit 140 for displaying the POI data thereon.

Next are described operations of the navigation apparatus 10, more specifically: 1) a processing of updating a plurality of POI data one by one; 2) a processing of mass updating a plurality of POI data; and 3) a processing of presenting the number of hits obtained in a search of POI data.

Below is described 1) the processing of updating a plurality of POI data one by one.

Figure 9:
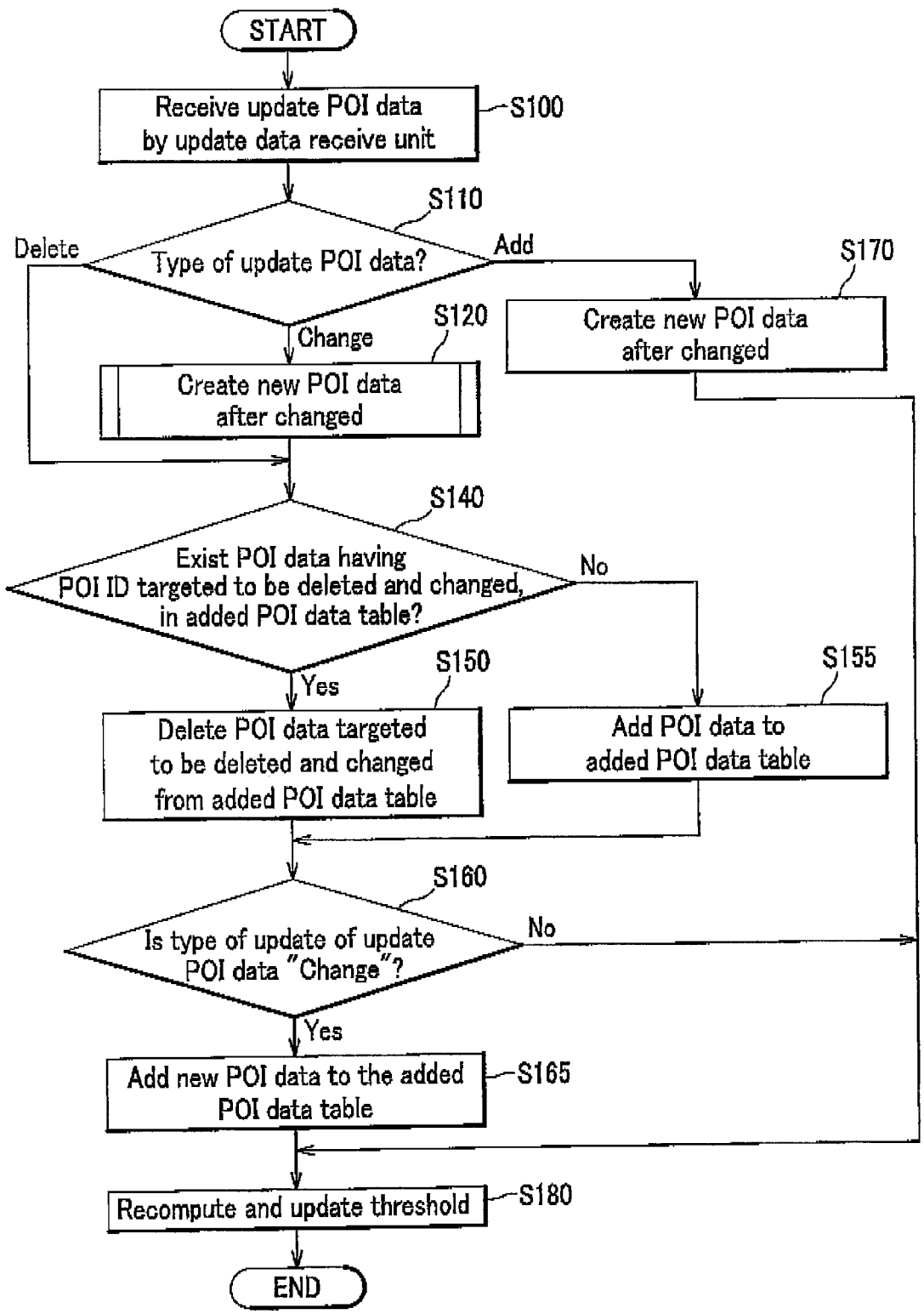
FIG. 9 is a flowchart of a processing of updating a POI data.
Figure 10:
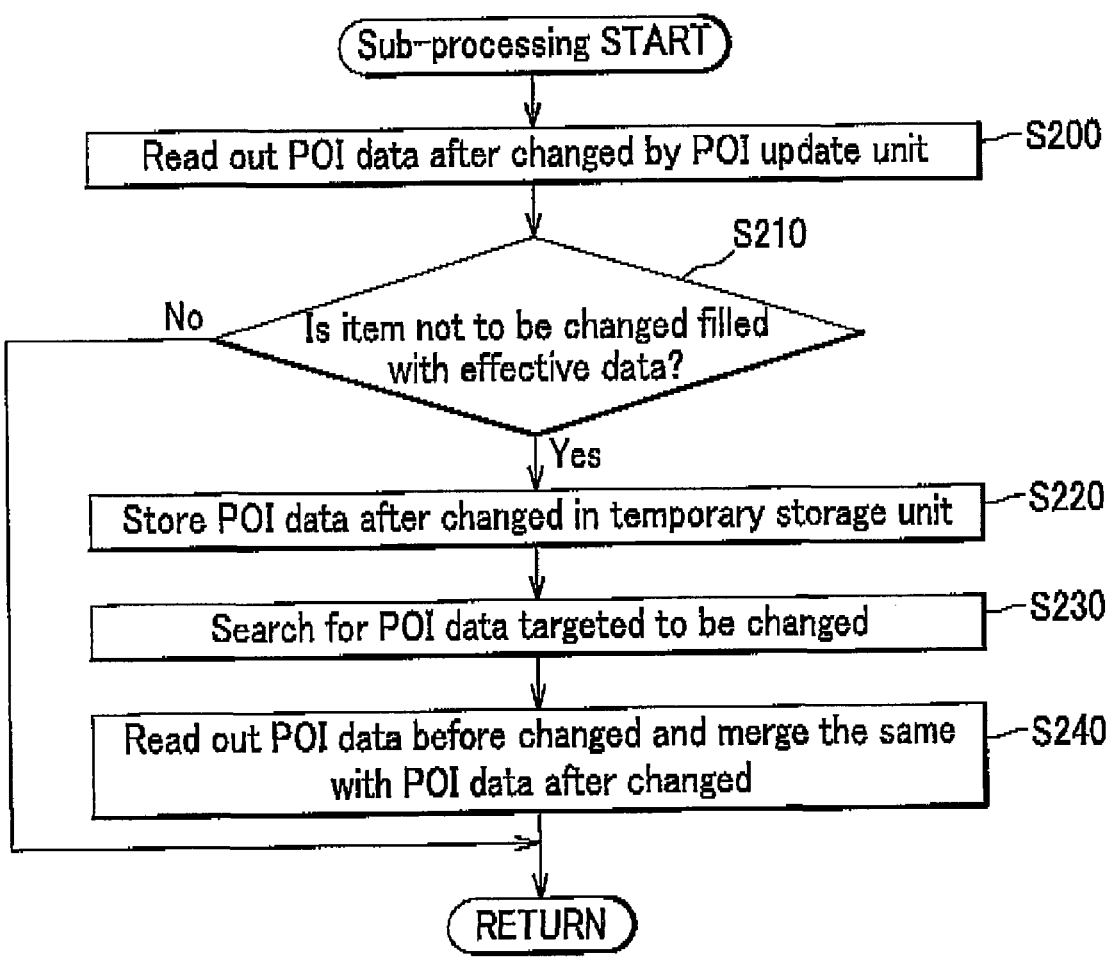
FIG. 10 is a flowchart of a sub-processing of creating a POI data after the data is changed, and corresponds to a subflowchart of FIG. 9.

FIG. 9 and FIG. 10 are flowcharts showing the processing of updating a plurality of POI data one by one.

As described above, in this embodiment, an "update" of a POI data is divided into three types, namely, "delete", "add", and "change".

"Change" is conducted by combining "delete" and "add". That is, an "old" POI data before changed is deleted, and a new POI data after changed is added.

"Delete" of a POI data means that the POI data is excluded from a target for a search. More specifically, a deletion of a POI data stored in the static POI data table T1 is conducted by registering a POI ID of the POI data into the deleted POI data table T3. Meanwhile, a deletion of a POI data stored in the static POI data table T2 is conducted not by registering a POI ID of the POI data into the deleted POI data table T3 but by deleting the POI data from the added POI data table T2.

The flowchart of FIG. 9 starts with a step of receiving an update POI data by the update data receive unit 160 (S100). As described above, the update POI data is one of the "update POI data of a POI to be deleted" T4, "update POI data of a POI to be added" T5, or "update POI data of a POI to be changed" T7.

The POI update unit 150 determines which type of the update among "add", "delete" or "change" the update POI data has from the update type (see 265, 243, 345 in FIG. 5, FIG. 6, and FIG. 7A and FIG. 7B, respectively) included in the update POI data (S110).

If the type of the update is "add", the POI update unit 150 adds the update POI data received in S100 to the added POI data table T2 (S170). The POI update unit 150 then advances the processing to S180 to be described later.

If the type of the update is "delete", the POI update unit 150 advances the processing to step S140.

If the type of the update is "change", the POI update unit 150 creates a new POI data after changed (S120).

FIG. 10 is a flowchart of a sub-processing of creating a new POI data after changed.

The POI update unit 150 reads out the update POI data received in S100 (S200) and determines whether or not the read POI data is of a completed type, all of which items are filled with data (that is, any of which item even not to be changed is filled with an effective data, like the "update POI data of a POI changed" T7' of FIG. 7B (S210). If the read POI data is of the completed type (if Yes in S210), the POI update unit 150 terminates the sub-processing and returns to step S140 in the processing of FIG. 9.

If the read POI data is not of the completed type (such as the "update POI data of a POI data to be changed" T7 of FIG. 7A) (if No in S210), the POI update unit 150 temporarily stores the read update POI data in the temporary storage unit 130 (S220).

The first merge processing unit 105 sets a POI ID of the POI data to be changed (that is, a POI ID included in the POI data of a POI to be changed which has been read out in S100) as a search keyword, searches the added POI data table T2 and the static POI data table T1 in this order using the search keyword, and obtains a record of a POI data matching the search keyword (S230). It is to be noted that, if the POI data has ever been changed, the updated data must be stored in the added POI data table T2. Thus, the first merge processing unit 105 searches the added POI data table 72, and, if a record of a POI data matching the search keyword is found therein, the first merge processing unit 105 does not search the static POI data table T1 anymore.

The first merge processing unit 105 merges the POI data having the searched record with the POI data stored in S220 in the temporary storage unit 130 (S240). More specifically, if there is any item of the POI data stored in S220 in the temporary storage unit 130, in which an effective date of has not yet been filled (for example, the POI name 355 in the POI data T7 of FIG. 7A), the first merge processing unit 105 writes an effective data stored in a corresponding item of the record searched in S230. As a result of the merge, the temporary storage unit 130 has a new POI data, to all of which items effective data are set (see the POI data T7' of FIG. 7'). The POI update unit 150 then terminates the sub-processing and returns to step S140 in the processing of FIG. 9.

Referring back to FIG. 9, description of the processing of updating a POI data is continued below.

In S140, the POI update unit 150 searches the added POI data table T2 using a POI ID specified by the update POI data as a search keyword. If the POI ID specified by the update POI data is hit in the search (if Yes in S140), the POI update unit 150 deletes a POI data (record) having the POI ID (S150) from the added POI data table T2 and advances the processing to step S160. Note that, in S150, if a POI data already having been deleted is specified as a target for deletion, the POI update unit 150 displays a warning on the display unit 20 that the same POI data is specified as a target to be deleted again.

If the POI ID specified by the update POI data is not hit in the search (if No in S140), the POI update unit 150 stores the POI ID specified by the update POI data in the deleted POI data table T3 (S155) and advances the processing to S160.

In S160, the POI update unit 150 determines whether or not the type of update of the update POI data is "change". If the type of update is "change", (if Yes in S160), the POI update unit 150 adds the update POI data created in S120 to the added POI data table T2 (S165) and advances the processing to S180. If the type of update is not "change" but "delete" (if No in S160), the POI update unit 150 advances the processing to S180.

After completing the processing, the following observations are obtained.

Among POI data having been stored in the static POI data table T1 beforehand, a POI data which has never been subjected to an update exists only in the static POI data table T1.

Among the POI data having been stored in the static POI data table T1 beforehand, if a POI data has ever been subjected to an update, an updated data thereof exists in the added POI data table T2, and a POI ID thereof exists in the deleted POI data table T3.

Among the POI data having been stored in the static POI data table T1 beforehand, if a POI data has been deleted without having ever been subjected to an update, a POI ID thereof exists in the deleted POI data table T3.

Among the POI data having been stored in the static POI data table T1 beforehand, if a POI data has ever been subjected to an update and has been then deleted, a POI ID thereof exists in the deleted POI data table T3 at the time of the deletion. However, the POI data stored in the added POI data table T2 is deleted.

If an added POI data is stored in the added POI data table T2 and is then subjected to a change, a record of the added POI data before changed is deleted, and a record of the added POI data after changed is stored in the added POI data table T2.

If an added POI data is subjected to a deletion, a record of the added POI data is deleted from the added POI data table T2. In this case, a POI ID of the added POI data is not stored in the deleted POI data table T3.

In other words, the deleted POI data table T3 includes: a POI ID of a POI data deleted from among the POI data in the static POI data table T1 (that is, a POI ID which is not subjected to a search); and a POI ID of a POI data among the POI data in the static POI data table T1, which is subjected to a change and is stored in the added POI data table T2.

In S180, the POI update unit 150 makes the count mode select unit 135 perform an update of a threshold used in determining the count mode of the number of hits. The threshold is computed as described above. The count mode select unit 135 performs the update of a threshold by, for example, obtaining a total number of POI IDs stored in the deleted POI data table T3, computing an updated threshold from the total number and a total number of POIs in the static POI data table T1, and storing the threshold in the temporary storage unit 130. The POI update unit 150 then terminates the processing.

The total number of POI data in the static POI data table T1 can be obtained at the time of manufacturing the navigation apparatus 10. Thus, the total number may be hard coded in an appropriate program or may be stored in the temporary storage unit 130.

The processing of updating a plurality of POI data one by one is as explained above.

Next is described 2) the processing of mass updating a plurality of POI data.

Herein is described a processing of mass updating a plurality of POI data by area, using file updating, which is effective in updating a large number of POIs. The processing is effective if the static POI data storage unit 100 for storing the static POI data table T1 and the static POI count storage unit 110 for storing the static POI count table 400 are each configured by a plurality of files, and each of the files has a POI data in each area and the number of hits.

For example, if a plurality of POI data is divided by 47 Japanese prefectures, the static POI data storage unit 100 is configured by 47 POI data files. In such a file configuration, if a file configuring the storage units 100, 110, 115, 120 and divided by area is overwritten, all the data in the file is mass updated in block. Such a mass update by file has an advantage that data on a large number of POIs can be updated at a higher rate than that of an update one by one. In this regard, however, if a POI data in an area subjected to file updating exists in the added POI data storage unit 120 or the deleted POI data s storage unit 115, such an "old" POI data is also subjected to a search after the mass update. Therefore, before conducting the mass file update targeting an area, a POI data in the targeted area stored in the deleted POI data storage unit 115 and the added POI data storage unit 120 is deleted.

Figure 11:
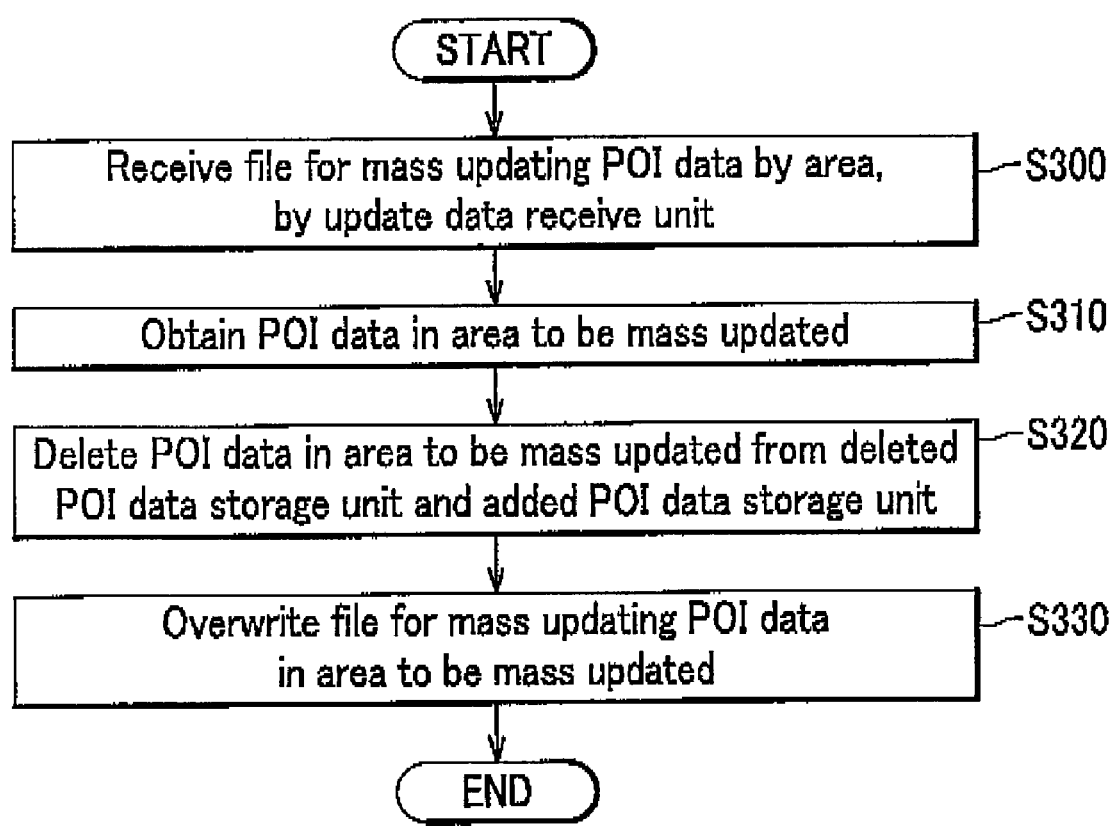
FIG. 11 is a flowchart of processing of mass updating a POI data by area.

FIG. 11 is a flowchart of a processing of mass updating a POI data by area. Note that the deleted POI data storage unit 115 or the added POI data storage unit 120 may have files divided by area, like the static POI data storage unit 100, or may have a single file with POI data in all areas included therein.

The flowchart of FIG. 11 starts with a step of receiving a file (which corresponds to the static POI count table 400) containing all the POI data in an area targeted for mass updating and the number of hits of the POI data (S300), by the update data receive unit 160.

The POI update unit 150 obtains a POI data belonging to an area to be updated, from the update data receive unit 160 (S310). The POI data in the area to be updated includes a data for identifying the area to be updated such as an area ID.

The POI update unit 150 deletes the POI data in the area to be mass updated from the deleted POI data storage unit 115 and the added POI data storage unit 120, if any (S320). If the deleted POI data storage unit 115 and the added POI data storage unit 120 are each divided by area, the POI update unit 150 deletes all of the POI data existing in a file of the area to be mass updated.

The POI update unit 150 overwrites respective files of the area to be mass updated both in the static POI data storage unit 100 and in the static POI count storage unit 110 (S330). The POI update unit 150 then terminates the processing.

Next is described 3) the processing of computing the number of hits in a search of POI data to be presented to a user.

Figure 12:
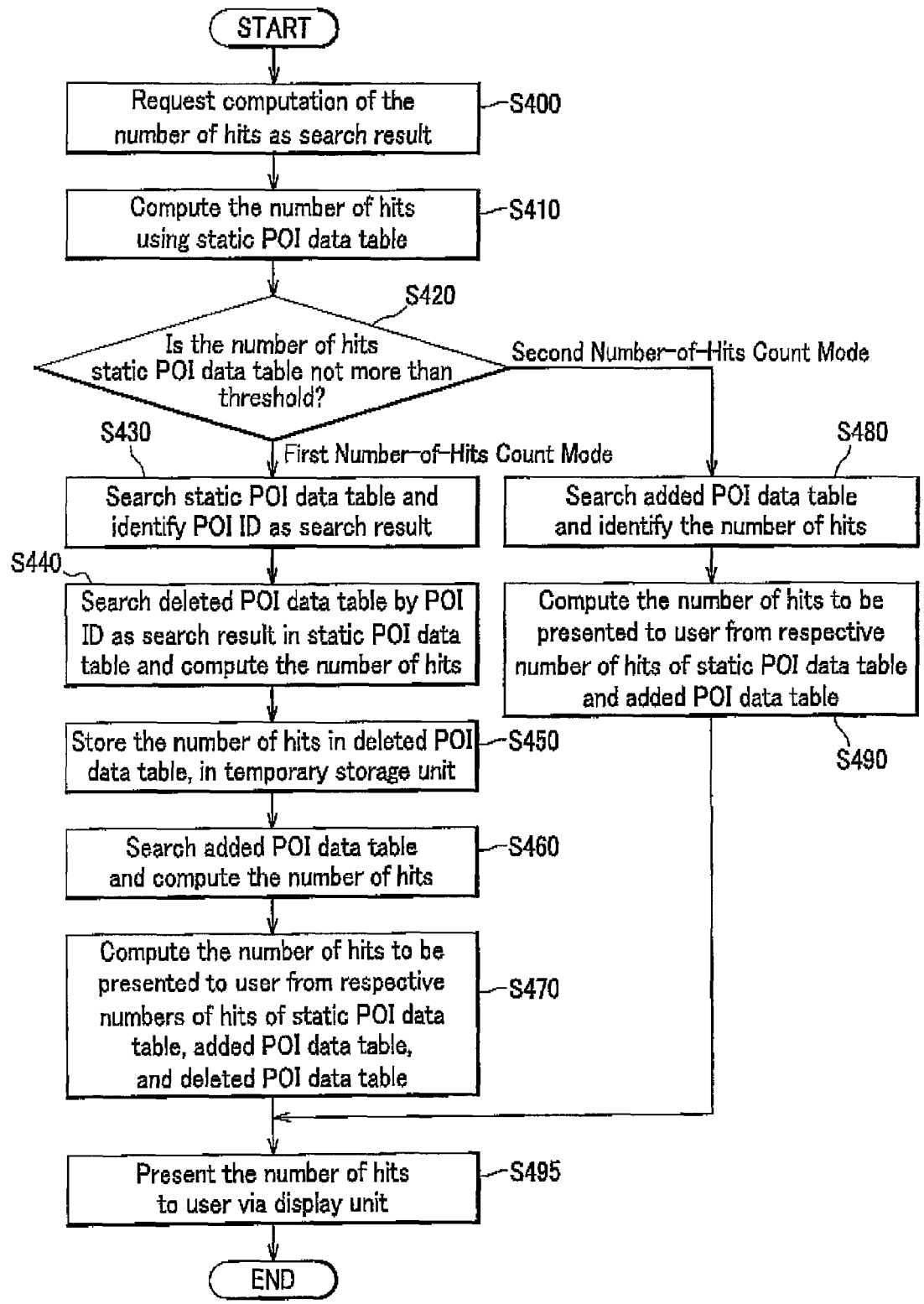
FIG. 12 is a flowchart of processing of computing the number of hits in a search of POI data.

FIG. 12 is a flowchart of a processing of computing the number of hits in a search of POI data.

The flowchart of FIG. 12 starts with a step of receiving a search request from a user via the input unit 19 by the control unit 155.

Upon receiving a search keyword from the user, the control unit 155 sets the search keyword in the POI search unit 145 and requests a computation of the number of hits to be presented to the user, to the POI search unit 145 (S400).

The control unit 155 requests the computation of the number of hits only when a display of the number of hits is required. For example, the computation of the number of hits is requested when a user narrows down a search by further setting a search keyword.

The POI search unit 145 obtains the number of hits when the static POI data table T1 is searched by the search keyword set in S400 and stores the obtained number of hits in the temporary storage unit 130 (S410). More specifically, the POI search unit 145 references the static POI count table 400 and identifies the number of hits (412 in FIG. 4A, 414 in FIG. 4B) which corresponds to the search keyword (410, 411, 413 in FIG. 4A).

In this embodiment, the static POI count table 400 facilitates a high-speed processing. However, the embodiment is not limited to this. The POI search unit 145 may obtain the number of hits by directly searching the static POI data table T1 and computing the number of hits of a POI data (record) matching the search keyword.

The POI search unit 145 determines whether or not the number of hits obtained in S410 (the number of hits obtained by searching the static POI data table T1) is not more than the threshold 295 stored in the temporary storage unit 130 (S420).

If the number of hits obtained in S410 is not more than the threshold 295 (if Yes in S420), the POI search unit 145 advances the processing to S430, which proceeds to the first number-of-hits count mode. If the number of hits obtained in S410 is more than the threshold 295 (if No in S420), the POI search unit 145 advances the processing to S480, which proceeds to the second number-of-hits count mode.

In the first number-of-hits count mode, the POI search unit 145 searches the static POI data table T1 by the search keyword set in S400 and identifies a POI ID of a POI data matching the search keyword (S430). FIG. 13 shows an example of a search result when the static POI data table T1 is searched.

The POI search unit 145 searches the deleted POI data table T3 by the identified POI ID as a search keyword and computes the number of hits (S440). The POI search unit 145 stores the computed number of hits in the temporary storage unit 130 as shown in FIG. 8 (S450).

The POI search unit 145 then searches the added POI data table T2 by the search keyword set in S400, computes the number of hits, and stores the computed number of hits in the temporary storage unit 130 (S460).

The second merge processing unit 106 reads out the numbers of hits stored in the temporary storage unit 130 and computes the number of hits to be presented to a user, by an expression as follows:

[the number of hits presented to a user]=[the number of hits 276 when the static POI data table T1 is searched]−[the number of hits 278 when the deleted POI data table T3 is searched]+[the number of hits 277 when the added POI data table T2 is searched] (S470). The second merge processing unit 106 then advances the processing to S495.

In the second number-of-hits count mode (if No in S420), the POI search unit 145 searches the added POI data table T2 by the search keyword set in S400, obtains the number of hits, and stores the obtained number of hits in the temporary storage unit 130 (S480).

The second merge processing unit 106 reads out the number of hits in the temporary storage unit 130 and computes the number of hits to be presented to a user, by an expression as follows:

[the number of hits to be presented to a user]=[the number of hits 276 when the static POI data table T1 is searched]+[the number of hits 277 when the added POI data table T2 is searched] (S490). The second merge processing unit 106 then advances the processing to S495.

In S495, the POI search unit 145 presents the number of hits computed in S470 or S490 to the user via the display unit 140.

FIG. 14A and FIG. 14B each shows an example of a display of the number of hits.

When the POI search unit 145 displays the number of hits on a screen, the POI search unit 145 displays a value of the number of hits in characters at a prescribed position thereon. The POI search unit 145 may display the number of hits with images such as a graph or by voice, for example, by reading aloud the value of the number of hits using a voice synthesis software or the like.

FIG. 14A and FIG. 14B each show the number of hits displayed on a screen 600. FIG. 14A shows a state in which "convenience store" is selected when a search is conducted by a search keyword of the POI category. FIG. 14B shows a state in which the number of hits 601 of 120,000 is displayed upon the selection of the "convenience store".

After displaying the number of hits, the POI search unit 145 terminates the processing.

Above are described the operations of the navigation apparatus 10 according to the embodiment of the present invention.

According to the embodiment, the number of hits as a search result can be quickly obtained and presented to a user while reducing a load of processing.

In the related art, the number of hits is computed by always reflecting the number of deleted data, regardless of whether or not the number of hits is considerably large, for example, when a user inputs a first new search keyword. If the number of hits is considerably large, the computed number of hits results in much the same with or without reflecting the deleted number. That is, computation of the deleted number is not so meaningful in spite of a time required for the processing in such a case. In the embodiment, whether or not the number of hits is sufficiently small is automatically determined so as to determine whether or not the calculation of the deleted number is effective. Only if the calculation of the deleted number is determined to be effective, the calculation is actually conducted, which corresponds to the first number-of-hits count mode. On the other hand, if the calculation of the deleted number is not determined to be effective, the calculation is not conducted, which corresponds to the second number-of-hits count mode.

The number of updated POI data is herein considerably smaller than the number of POI data which is stored in the navigation apparatus 10 at shipment. Thus, it is estimated that, if the number of POI data at the time of manufacturing the navigation apparatus 10 is relatively large, the number of deleted POI data has a relatively small effect on the number of hits as a search result. The calculation of the number of hits without reflecting the number of deleted POI data in such a case therefore does not reduce convenience of a user.

The present invention can be applied not only to a navigation apparatus for automobile use but also to a stationary computing machine, a portable terminal, and the like.

The embodiment according to the present invention has been explained as aforementioned. However, the embodiment of the present invention is not limited to the explanation, and those skilled in the art ascertain the essential characteristics of the present invention and can make the various modifications and variations to the present invention to adapt it to various usages and conditions without departing from the spirit and scope of the claims.

The invention claimed is:

1. A point of interest (POI) search device, comprising:
a static POI data storage unit that stores static POI data, the static POI data being data on a prescribed POI;
an added POI data storage unit that stores added POI data, the added POI data being POI data to be added as a new search target or POI data for changing POI data contained in the static POI data;
a deleted POI data storage unit that stores deleted POI data, the deleted POI data being data for identifying POI data not subjected to a search in the static POI data;
a search keyword setting unit that sets a search keyword used in searching the static POI data and/or the added POI data with respect to at least a POI name and a POI category;
a POI search unit that computes a number of hits of POI data as a search result which matches the search keyword with respect to at least the static POI data and the added POI data; and
a computation switch unit that computes the number of POI data matching the search keyword from among the static POI data, and that switches a computation processing of computing the number of POI data as a search result in the POI search unit according to the computed number of POI data;
wherein the computation switch unit switches, if the number of hits of the POI data matching the search keyword computed from the static POI data is not more than a prescribed threshold, the computation processing to a processing of using the deleted POI data when the POI search unit computes the number of hits of the POI data as the search result to be presented to a user, and
switches, if the number of hits of the POI data is more than the prescribed threshold, the computation processing to a processing of not using the deleted POI data when the POI search unit computes the number of hits of the POI data as the search result to be presented to the user.

2. The POI search device according to claim 1,
wherein, if the computation switch unit switches the computation processing to the processing of using the deleted POI data, the POI search unit computes the number of the POI data as the search result by adding the number of the added POI data matching the search keyword to the static POI data matching the search keyword and subtracting the number of the static POI data matching the search keyword from the number of POI data identified by the deleted POI data and not subjected to the search, and presents the obtained number as the search result to the user, and
wherein, if the computation switch unit switches the computation processing to the processing of not using the deleted POI data, the POI search unit computes the searched number of the POI data as the search result by adding the number of the added POI data matching the search keyword to the static POI data matching the search keyword, and presents the obtained number as the search result to the user.

3. The POI search device according to claim 2, further comprising a keyword matching POI data number storage unit that stores a static POI number data which includes the numbers of POI data as search results, if the static POI data is searched for each search keyword, wherein the computation switch unit and the POI search unit compute the number of static POI data matching the search keyword set by the search keyword setting unit, using the static POI number data.

4. The POI search device according to claim 2, further comprising a POI data update unit that receives data for updating the static POI data or the added POI data, and for updating the deleted POI data and the added POI data.

5. The POI search device according to claim 4, wherein, if the POI data update unit deletes a POI data stored in the static POI data, the POI data update unit stores a data indicating that the deleted POI data is not subjected to the search anymore, in the deleted POI data, wherein, if the POI data update unit receives a POI data to be added, the POI data update unit adds the POI data to be added to the added POI data, wherein, if the POI data update unit changes a POI data and if the POI data to be changed has already existed in the added POI data, the POI data update means changes the POI data existing in the added POI data, and wherein, if the POI data update unit changes a POI data and if the POI data to be changed does not exist in the added POI data, the POI data update unit adds the changed POI data to the added POI data and stores, in the deleted POI data, a data indicating that a POI data which corresponds to the POI data subjected to being changed and existing in the static POI data is not subjected to the search anymore.

6. The POI search device according to claim 1, further comprising a keyword matching POI data number storage unit that stores a static POI number data which includes the numbers of POI data as search results, if the static POI data is searched for each search keyword, wherein the computation switch unit and the POI search unit compute the number of static POI data matching the search keyword set by the search keyword setting unit, using the static POI number data.

7. The POI search device according to claim 1, further comprising a POI data update unit that receives data for updating the static POI data or the added POI data, and for updating the deleted POI data and the added POI data.

8. The POI search device according to claim 7, wherein, if the POI data update unit deletes a POI data stored in the static POI data, the POI data update unit stores a data indicating that the deleted POI data is not subjected to the search anymore, in the deleted POI data, wherein, if the POI data update unit receives a POI data to be added, the POI data update unit adds the POI data to be added to the added POI data, wherein, if the POI data update unit changes a POI data and if the POI data to be changed has already existed in the added POI data, the POI data update unit changes the POI data existing in the added POI data, and wherein, if the POI data update unit changes a POI data and if the POI data to be changed does not exist in the added POI data, the POI data update unit adds the changed POI data to the added POI data and stores, in the deleted POI data, a data indicating that a POI data which corresponds to the POI data subjected to being changed and existing in the static POI data is not subjected to the search anymore.

9. The POI search device according to claim 1, further comprising:

a mass update unit that mass updates the static POI data including both a POI data changed and a POI data unchanged, for each area to which a POI data included in the static POI data belongs.

10. The POI search device according to claim 9, wherein the mass update unit deletes a data concerning a POI data belonging to an area to be updated each from the deleted POI data and the added POI data, and overwrites a data concerning a POI data belonging to an area to be updated from the static POI data.

11. A point of interest (POI) search method of a POI search device, the POI search device comprising a first data store for static POI data which is POI data on a prescribed POI, a second data store for added POI data which is POI data to be added as a new search target or POI data for changing POI data contained in the static POI data, and a third data store for deleted POI data which is data for identifying POI data not subjected to a search in the static POI data, the POI search method comprising:

setting a search keyword used in searching the static POI data and/or the added POI data with respect to at least a POI name and a POI category;

computing the number of POI data matching the search keyword from among the static POI data and switching a computation processing of computing the number of POI data as a search result according to the computed number of POI data; wherein if the number of hits of the POI data matching the search keyword computed from the static POI data is not more than a prescribed threshold, switching the computation processing to a processing of using the deleted POI data when the POI search unit computes the number of hits of the POI data as the search result to be presented to a user, and if the number of hits of the POI data is more than the prescribed threshold, switching the computation processing to a processing of not using the deleted POI data when the POI search unit computes the number of hits of the POI data as the search result to be presented to the user.

* * * * *